US010870792B2

(12) United States Patent
López Reyes et al.

(10) Patent No.: US 10,870,792 B2
(45) Date of Patent: Dec. 22, 2020

(54) ULTRA-HIGH-MOLECULAR-WEIGHT POLYOLEFIN PROPPANTS

(71) Applicant: REPSOL, S.A., Madrid (ES)

(72) Inventors: Manuel López Reyes, Móstoles-Madrid (ES); Ricardo César Bezerra De Melo, Móstoles-Madrid (ES); Jacobo Canal Vila, Móstoles-Madrid (ES); Itziar Martínez Cebrián, Madrid (ES); Richard Llewellyn Lolley Bowen, Madrid (ES); Ana Isabel Montenegro García, Móstoles-Madrid (ES)

(73) Assignee: REPSOL, S.A., Madrid (ES)

( * ) Notice: Subject to any disclaimer, the term of this patent is extended or adjusted under 35 U.S.C. 154(b) by 0 days.

(21) Appl. No.: 15/552,668

(22) PCT Filed: Feb. 25, 2016

(86) PCT No.: PCT/EP2016/054004
§ 371 (c)(1),
(2) Date: Aug. 22, 2017

(87) PCT Pub. No.: WO2016/135253
PCT Pub. Date: Sep. 1, 2016

(65) Prior Publication Data
US 2018/0044574 A1    Feb. 15, 2018

(30) Foreign Application Priority Data
Feb. 26, 2015 (EP) .................................... 15382079

(51) Int. Cl.
| C09K 8/80 | (2006.01) |
| E21B 43/267 | (2006.01) |
| C09K 8/62 | (2006.01) |
| E21B 21/00 | (2006.01) |

(52) U.S. Cl.
CPC .................. C09K 8/80 (2013.01); C09K 8/62 (2013.01); C09K 8/805 (2013.01); E21B 43/267 (2013.01); E21B 21/003 (2013.01)

(58) Field of Classification Search
CPC .................. E21B 43/26; C09K 8/80
See application file for complete search history.

(56) References Cited

U.S. PATENT DOCUMENTS

| 6,038,433 A | 3/2000 | Martin et al. |
| 6,384,163 B1 | 5/2002 | da Silva et al. |
| 2006/0151170 A1 | 7/2006 | Brannon et al. |
| 2007/0144736 A1 | 6/2007 | Shinbach et al. |
| 2008/0060809 A1 | 3/2008 | Parker et al. |
| 2009/0095473 A1* | 4/2009 | Stephenson ............ C09K 8/805 166/280.2 |
| 2013/0092374 A1 | 4/2013 | Fulton et al. |
| 2014/0202696 A1 | 7/2014 | Hong et al. |
| 2015/0204178 A1 | 7/2015 | Willberg et al. |
| 2017/0121594 A1 | 5/2017 | Baleno et al. |

FOREIGN PATENT DOCUMENTS

| EP | 0626393 A1 | 5/1994 |
| EP | 0683178 A1 | 11/1995 |
| EP | 0878490 A2 | 11/1998 |
| JP | H07292021 A | 11/1995 |
| WO | 2010021563 A1 | 2/2010 |
| WO | 2013036350 A1 | 3/2013 |
| WO | 2013068325 A1 | 5/2013 |

OTHER PUBLICATIONS

Ticona. GUR ultra-high molecular weight polyethylene (PE-UHMW), 2001.*
S. R. Darin, et al.; "Effect of a Partial Monolayer of Propping Agent on Fractrue Flow Capacity", Petroleum Transactions, AIME, 1960, vol. 219, pp. 31-37 SPE-1291-G, Society of Petroleum Engineers; Abstract Only.
Shamiri et al.; "The Influence of Ziegler-Natta and Metallocene Catalysts on Polyolefin Structure, Properties, and Processing Ability" Materials, 2014, vol. 7, pp. 5069-5108.
Barandiaran, Maria J., et al.; "Polymer Reaction Engineering," Chapter 6, Emulsion Polymerization, 2007, pp. 233-271, Blackwell Publishing Ltd, Garsington Road, Oxford.
International Search Report, dated Apr. 2, 2015.

* cited by examiner

*Primary Examiner* — Angela M DiTrani Leff
*Assistant Examiner* — Avi T Skaist
(74) *Attorney, Agent, or Firm* — Tristan A. Fuierer; Olive Law Group, PLLC

(57) ABSTRACT

The present invention relates to the use of ultra-high-molecular-weight polyolefin particles as proppants for treating subterranean formations, as well as to compositions comprising said particles and to fracturing methods employing said particles.

20 Claims, No Drawings

ULTRA-HIGH-MOLECULAR-WEIGHT POLYOLEFIN PROPPANTS

CROSS-REFERENCE TO RELATED APPLICATIONS

This application is filed under the provisions of 35 U.S.C. § 371 and claims the priority of International Patent Application No. PCT/EP2016/054004 filed on 25 Feb. 2016 entitled "ULTRA-HIGH-MOLECULAR-WEIGHT POLYOLEFIN PROPPANTS" in the name of Manuel LOPEZ REYES, et al., which claims priority to European Patent Application No. 15382079.0, filed on 26 Feb. 2015, both of which are hereby incorporated by reference herein in their entirety.

FIELD OF THE INVENTION

The present invention relates generally to proppants and their use in fracturing operations for subterranean formations. More particularly, the present invention relates to ultra-high-molecular-weight polyolefin proppants and their use in fracturing operations for subterranean formations.

PRIOR ART

In oil and gas operations, stimulation or treatment of subterranean formations using a fluid containing suspended particles may be used to improve production. This process is generally known as hydraulic fracturing. In particular, a fluid, referred to in the art as a treatment fluid, is usually pumped or injected through a wellbore into the subterranean formation to be stimulated at a rate and pressure such that existing fractures are opened and/or new fractures are formed and extended into the subterranean formation, increasing the inflow area. The treatment fluid carries particles, referred to in the art as proppant particles, into the fractures. The particles are placed in the fractures and the fracturing fluid dissipates into the subterranean formation and/or is returned to the surface. The particles function to "prop" open or prevent the fractures from totally closing the formation fractured faces back together, whereby conductive channels remain through which produced fluids can flow to the wellbore. Hydraulic fracturing is particularly useful in stimulating the productivity of gas and oil wells in low permeability reservoirs, but may also be applied to moderate to high permeability reservoirs to overcome any potential damage the reservoir may have suffered.

The degree of success of a hydraulic fracturing operation depends greatly upon effective fracture conductivity once the pumping of proppant laden fluid is finished and production is begun. The conductivity of a fracture is largely given by the permeability to extracted fluids of the proppant particles packed into the fracture times the average effective fracture width, this must be higher than the reservoir capacity of delivering fluids into the fracture. Proppant particulates should agglomerate within the fracture such that they form interstitial spaces through which the fluid to be extracted can flow. Generally, the larger the interstitial spaces between proppant particles, the greater the permeability and hence conductivity of the fracture.

A crucial factor determining the permeability of proppant particles is their resistance to fracture closure stress. Resistance to fracture closure stress must be such that the proppant particles do not break into smaller fragments or fines which can reduce the permeability of the propped fracture by plugging it, resulting in a decreased productivity of fluid extraction from the well over time. Plugging may also occur when proppant particles deform in excess when subjected to fracture closure stress.

If the interstitial spaces of a propping particulate are too large, this may lead to reduced resistance to fracture closure. Therefore, the configuration of ideal propping particulates is one that is sufficiently porous so as to maximize the flow of extracted fluid, but not so porous so as to disintegrate or greatly deform under fracture closure stress.

Propping compositions are traditionally based on sand, glass or ceramics. However, these types of proppants generally tend be relatively prone to disintegration or crushing into fines. Many efforts have therefore involved the careful study and modification of the different physical properties underlying the behavior of classical proppants. A particularly popular line of investigation has been the modification of classical proppants with polymeric resins, as disclosed for example in US 2007/0144736 A1.

Other efforts diverging more from classical proppant compositions introduce polymeric materials themselves as the constitutive component of proppant compositions. WO 2013/036350 A1 for instance describes methods for treating subterranean formations by injecting into the subterranean formation a fluid composition that includes a fluid and a deformable proppant having an interpenetrating polymer network formed from a first polymer component and a second polymer component. WO2013/068325 discloses proppant particulates comprising at least one aromatic polycondensation polymer having a glass transition temperature ($T_g$) of at least 120° C.

A group of polymers of particular relevance to the present invention are polyolefins. US2008/0060809 provides a method of fracturing a portion of a subterranean formation with a slurry comprising a fracturing fluid and high density plastic particulates among which polyolefins are considered together with an exhaustive list of other polymers. US 2009/0095473 A1 describes a method of fracturing a hydrocarbon-bearing formation which involves introducing into the formation a proppant comprising a composite of a porous polyolefin treated with a coating layer. US 2013/0092374 A1 discloses a proppant composition comprising a substantially deformable organic polymer which may be high density polyethylene, polyethylene terephthalate or polypropylene.

A continuous need however exists to develop new proppant compositions which enrich the number of fracturing solutions available to the oil/gas industry.

SUMMARY OF THE INVENTION

The authors of the present invention have found that the use of particles of ultrahigh molecular weight polyolefin as proppants in fracturing processes confers many advantages over classical proppants or other polymers.

Thus, an aspect of the present invention relates to the use of particles comprising an ultra-high-molecular-weight polyolefin as proppants for treating a subterranean formation, wherein the ultra-high-molecular-weight polyolefin has a viscosity average molecular weight ranging from $0.8 \times 10^6$ to $12 \times 10^6$ g/mol, an apparent density lying in the range from 0.2 to 0.7 g/mL, and wherein the sphericity of the particles is 0.5 or higher.

Another aspect of the invention refers to a fracturing composition comprising:
  a) particles comprising an ultra-high-molecular-weight polyolefin, wherein the ultra-high-molecular-weight polyolefin has a viscosity average molecular weight ranging from $0.8 \times 10^6$ to $12 \times 10^6$ g/mol, and an apparent density lying in the range from 0.2 to 0.7 g/mL, and wherein the sphericity of the particles is 0.5 or higher, and b) a treatment fluid suitable for carrying the particles.

In yet another aspect, the invention relates to a method of treating a subterranean geological formation penetrated by a wellbore, the method comprising injecting into the wellbore:

a) a plurality of particles, said particles comprising an ultra-high-molecular-weight polyolefin, wherein the ultra-high-molecular-weight polyolefin has a viscosity average molecular weight ranging from $0.8 \times 10^6$ to $12 \times 10^6$ g/mol, an apparent density lying in the range from 0.2 to 0.7 g/mL, and wherein the sphericity of the particles is 0.5 or higher; or b) a fracturing composition according to the invention.

DETAILED DESCRIPTION OF THE INVENTION

The present invention relates to the use of particles comprising an ultra-high-molecular-weight polyolefin as proppants for treating a subterranean formation. Ultra-high molecular weight polyolefin is a general term commonly used to refer to macromolecular polyolefins with molecular weights in the $10^6$ g/mol range or higher. This term is however not intended to delimit the molecular weights of the polyolefins employed in the present invention, which are defined by precise viscosity average molecular weights.

In particular, the present invention relates to the use of particles comprising an ultra-high-molecular-weight polyolefin as proppants for treating a subterranean formation, wherein the ultra-high-molecular-weight polyolefin has a viscosity average molecular weight ranging from $0.8 \times 10^6$ to $12 \times 10^6$ g/mol, an apparent density lying in the range from 0.2 to 0.7 g/mL, and wherein the sphericity of the particles is 0.5 or higher.

As used herein, the term "polyolefin" also includes blends of different polyolefins and blends of polyolefins with any other polymeric material. Preferably, the proportion of ultra-high molecular weight polyolefin in the blend is at least 90% wt, even more preferably is of at least 95% wt. In a more preferred embodiment, the ultra-high molecular weight polyolefin is a homopolymer of a particular ultra-high molecular weight polyolefin.

As used herein, the term "polyolefin" also includes functionalized polyolefin, i.e. a polyolefin having additional chemical functionality, obtained through either copolymerization of olefin monomer with a functional monomer, or through graft copolymerization subsequent to olefin polymerisation. Typically, such functionalized groups include but are not limited to O, N, S, P, or halogen heteroatoms. Such reactive functionalized groups include but are not limited to carboxylic acid, hydroxyl, amide, nitrile, carboxylic acid anhydride, or halogen groups.

The properties of the ultra-high molecular weight polyolefin make the particles used in the invention particularly advantageous as proppants. Thus, the particles used in the present invention are also referred to as proppant particles.

In any of the embodiments of the present invention, the ultra-high molecular weight polyolefin is preferably ultra-high molecular weight polyethylene or ultra-high molecular weight polypropylene. In a particular embodiment, the ultra-high molecular weight polyolefin is ultra-high molecular weight polyethylene. In another particular embodiment, the ultra-high molecular weight polyolefin is ultra-high molecular weight polypropylene.

The particles used in the present invention comprise ultra-high molecular weight polyolefin macromolecules which are inherently considerably viscous. Particularly, the viscosity average molecular weight of the ultra-high molecular weight polyolefin ranges from $0.8 \times 10^6$ to $12 \times 10^6$. Viscosity average molecular weights can be calculated by methods known in the art. For instance, viscosity average molecular weights may be calculated from the intrinsic viscosity [η] of the ultra-high molecular weight polyolefin as measured according to known standards. In the context of the present invention intrinsic viscosity is measured according to ASTM D4020-11. For instance, in the context of the present invention, the Margolies-equation is applied to determine ultra-high molecular weight polyethylene molecular weights according to ASTM D4020-11:

$$Mw = 5.37 \times 10^4 \times [\eta]^{1.49}$$

where Mw=viscosity average molecular weight (g/mol); [η]=intrinsic viscosity (dl/g), measured according to ASTM D4020-11.

In an embodiment, the viscosimetric average molecular weight of the ultra-high molecular weight polyolefin ranges from $0.8 \times 10^6$ to $10 \times 10^6$ g/mol as calculated by the same method. In another embodiment, it ranges from $0.8 \times 10^6$ to $8 \times 10^6$ g/mol. In another embodiment, it ranges from $0.8 \times 10^6$ to $6.7 \times 10^6$ g/mol. In another embodiment, it ranges from $2 \times 10^6$ to $12 \times 10^6$ g/mol. In another embodiment, it ranges from $2 \times 10^6$ to $10 \times 10^6$ g/mol. In another embodiment, it ranges from $2 \times 10^6$ to $8 \times 10^6$ g/mol. In another embodiment, it ranges from $2 \times 10^6$ to $6.7 \times 10^6$ g/mol. In another embodiment, it ranges from $2.09 \times 10^6$ to $12 \times 10^6$ g/mol. In another embodiment, it ranges from $2.09 \times 10^6$ to $10 \times 10^6$ g/mol. In another embodiment, it ranges from $2.09 \times 10^6$ to $8 \times 10^6$ g/mol. In another embodiment, it ranges from $2.09 \times 10^6$ to $6.7 \times 10^6$ g/mol. In another embodiment, it ranges from $2.18 \times 10^6$ to $12 \times 10^6$ g/mol. In another embodiment, it ranges from $2.18 \times 10^6$ to $10 \times 10^6$ g/mol. In another embodiment, it ranges from $2.18 \times 10^6$ to $8 \times 10^6$ g/mol. In another embodiment, it ranges from $2.18 \times 10^6$ to $6.7 \times 10^6$ g/mol.

By virtue of the ultra-high molecular weights of the polyolefins used in the particles of the invention, the use of additives to improve fracture fluid viscosity is diminished in the context of the present invention. Therefore, in a particular embodiment, the composition of the invention as described below does not comprise or comprises reduced amounts of viscosity enhancing agents.

Additionally, the particles used in the invention are strong in the sense that they are hard to fragment under high levels of stress, leading to a low generation of fines, ultimately maintaining the fracture highly conductive over time. Moreover, the reduction in fine generation provides for a lesser extent of impurities leaked into the extracted fluid.

The particles used in the invention are relatively low-density particles. Particularly, the ultra-high molecular weight polyolefin comprised in the particles of the invention has an apparent density lying in the range from 0.2 to 0.7 g/mL. In another embodiment, the apparent density lies in the range from 0.2 to 0.6 g/mL. In another embodiment, the apparent density lies in the range from 0.2 to 0.54 g/mL. In another embodiment, the apparent density lies in the range from 0.2 to 0.5 g/mL. In another embodiment, it lies in the range from 0.3 to 0.7 g/mL. In another embodiment, it lies in the range from 0.3 to 0.6 g/mL. In another embodiment, it lies in the range from 0.3 to 0.54 g/mL. In another embodiment, it lies in the range from 0.3 to 0.5 g/mL. In any of these embodiments, or in a particular embodiment, the ultra-high molecular weight polyolefin comprised the particles of the invention has an absolute density of less than 1.0 g/mL.

In the context of the present invention, apparent density is determined according to ISO 60:1977. In the context of the present invention, absolute density is determined according to ISO 1183-1:2012.

The hydrophobic nature and described densities of the ultra-high molecular weight polyolefin confers to the particles a series of advantages over classical proppants or other polyolefins, including non-ultra-high molecular weight polyolefins, among which advantages the following stand out:

High pumping or injecting rates are not required in order to impart a sufficient velocity to place the proppant further far from the wellbore into the fracture. This implies a reduction in energy consumption needed to pump the proppant laden slurry and a lessening of acoustic contamination.

When using ultra-high molecular weight polyolefin proppant, a lower mass of proppant is required to achieve any desired fracture geometry when compared to the mass required with conventional proppants, implying reduced transportation costs and lower slurry volumes with consequent savings in energy and reduced environmental impact.

The proppant particles do not tend to sink to the bottom of the fracture but rather float in most water based treatment fluids, thus achieving a more uniform distribution of the proppant throughout the fracture, which improves conductivity of the propped fracture when compared with conventional proppants whose density exceeds that of water.

The shape of the particles used in the invention is typically substantially spherical, which further improves particle-particle interstitial permeability and hence the conductivity of the fracture.

In the present invention, the sphericity of any of the particles described herein is at least 0.5. In a particular embodiment, the sphericity of the particles is at least 0.7. Since it is exceedingly difficult to obtain perfectly spherical particles, i.e. with a sphericity value of 1, in a preferred embodiment, the particles are substantially spherical particles. Particles with minor deviations from a perfectly spherical shape are considered to be substantially spherical.

In the context of the present invention, sphericity is determined according to ISO 13503-2:2006

Additionally, in another embodiment of the invention, the particles display a roundness of 0.5 or higher, which further improves their permeability and hence the conductivity of the fracture. In a particular embodiment, the particles display a roundness ranging from 0.7 to 1.

In the context of the present invention, roundness is determined according to ISO 13503-2:2006.

In a particular embodiment, the particles display a sphericity and roundness as described immediately above.

The size of the particles of the present invention may depend, for example, on the characteristics of the subterranean formation selected for a fracturing and propping operation and completion design (size of perforations) to avoid in any of the cases near wellbore proppant bridge formation.

In addition, the particles of the invention display a narrow size distribution, which ensures that fracture stress is uniformly resisted by the particles throughout the whole fracture, thus contributing to enhanced fracture conductivity.

The span value is an indicator for the width of particle size distribution and is based on the 10%, 50% and 90% particle size quantiles as follows:

$$\text{Span}=(D(0.9)-D(0.1))/D(0.5)$$

where D(0.5) is the volume median diameter value of the particle size in a given particle population, where the volume median diameter of 50% of the particles in the population is below this value and 50% is above the value; D(0.1) is the value of the particle size in a given particle population, where the volume median diameter of 10% of the particles in the population is below this value and 90% is above the value; and D(0.9) is the value of the particle size in a given particle population, where the volume median diameter of 90% of the particles in the population is below this value and 10% is above the value.

A perfect monodisperse distribution would have a span of zero. The particles of the present invention suitably have a near monodisperse size distribution in that the particles display a particle size distribution span value not higher than 1.8. In a particular embodiment, the span value ranges between 0.6 and 1.8. In another particular embodiment, the span value ranges between 0.85 and 1.8. In another particular embodiment, the span value ranges between 0.97 and 1.8.

In a particular embodiment, the particle size distribution is unimodal. In another embodiment, it is bimodal. In another embodiment it is polymodal, e.g. trimodal.

In the context of the present invention, size distribution is determined according to ISO 13320:2009.

Advantageously, the density and size distribution of the particles used in the invention allow the placement of a partial monolayer of proppant particles along the fracture, as defined by S. R. Darin and J. L. Huitt, SPE-1291G, 1960.

In an embodiment of the present invention, the combination of the above described viscosity average molecular weights of the polyolefin comprised in the particles of the invention, along with the above described particle size distribution span values provides a proppant pack permeability of higher than $2.9607699 \times 10^{-15}$ m$^2$ (0.003 Darcys), as measured according to ISO 13503-5:2006 at a closure pressure of 13789514.56 Pa (2000 psi) (1 psi=6894.75729 Pa). In another embodiment, the permeability is $4.44115485 \times 10^{-15}$ m$^2$ (0.0045 Darcys) or higher. In another embodiment, the permeability ranges between higher than $2.9607699 \times 10^{-15}$ m$^2$ (0.0030 Darcys) and $2.9607699 \times 10^{-11}$ m$^2$ (30 Darcys). In another embodiment, it ranges between $4.44115485 \times 10^{-15}$ m$^2$ (0.0045 Darcys) and $2.9607699 \times 10^{-11}$ m$^2$ (30 Darcys). In another embodiment, the permeability ranges between higher than $2.9607699 \times 10^{-15}$ m$^2$ (0.0030 Darcys) and $1.9738466 \times 10^{-14}$ m$^2$ (0.0200 Darcys). In another embodiment, it ranges between $4.44115485 \times 10^{-15}$ m$^2$ (0.0045 Darcys) and $1.77646194 \times 10^{-14}$ m$^2$ (0.0180 Darcys). Advantageously, for a given proppant pack width the good permeabilities of the particles of the present invention allow achieving enhanced proppant pack conductivities, ultimately increasing productivity of fluid extraction. Proppant pack conductivity can be expressed as follows: kWf, where k is the proppant pack permeability, expressed in millidarcys;

Wf is proppant pack width, expressed in feet.

As known by the skilled person, 1 Darcy is equivalent to $9.869233 \times 10^{-13}$ m$^2$; and 1 foot is equivalent to 0.3048 m.

In the present text, values presented in SI units, followed in brackets by the corresponding value and unit in which the measurements are usually expressed/measured in the field of the invention. In case of any inconsistency, values and units in brackets should prevail. As mentioned above, conversion amongst units is general common knowledge.

In another particular embodiment, the particles used in the invention are porous, such that extracted fluid can flow through the proppant particles rather than just through the interstitial spaces. In an embodiment of the invention, the particles of the invention display a porosity between 2 and 50% by volume as determined by measurement of the ratio of the effective density of individual particles divided by the density of the solid material. This means that from 2 to 50% of the volume of the particles is in the form of pores. In the context of the present invention, porosity is measured according to ASTM D4222-03(2008) or ASTM D4284-12.

The particles used in the present invention display a slight deformability sufficient to prevent shattering of the particles under the closure pressure applied by a fracture. Moreover, the slight deformability of the particles of the invention is such that it reduces the chances of proppant backflow taking place.

By virtue of their mechanical properties, the particles of the invention typically display a crush resistance of between 0 and 5% at 27579029.12 Pa (4000 psi) as measured according to ISO 13503-2:2006.

In a particular embodiment of the invention, the particles comprise no additives.

In another particular embodiment, the particles used in the present invention can be treated with a coating and/or penetrating material using any suitable wet or dry process, such that the properties of the particles are selectively modified.

Thus, in a particular embodiment, the particles used in the present invention further comprise a coating material. Preferably, this coating material has a Tg of at least 80° C., more preferably between 80 and 120° C. in order to provide, for example, particle strength and to reduce in situ fine migration. This coating material can be placed on the surface of the particles in the form of a monolayer or multilayer. The thickness of the coating layer is generally between 1 and 5 microns.

Non-limiting examples of coating materials that may be used to coat the particles described herein include resins and/or plastics. Specific examples of plastic include, but are not limited to, nylon, polystyrene, polyol esters, divinyl benzene polystyrene, etc. and combinations thereof. Suitable resins include phenol formaldehyde resins, melamine formaldehyde resins, urethane resins, epoxy resins, and mixtures thereof. In a particular embodiment, the particles of the invention are coated with an electrically conductive material. Non-limiting examples of electrically conductive materials that may be used for coating are metals, e.g. aluminum, copper or nickel; conductive polymers, e.g. poly(3,4-ethylenedioxythiophene) poly(styrenesulfonate) (PEDOT:PSS), polyanilines (PANI), and polypyrroles (PPY); and conductive nanoparticles, e.g. graphite, single or double-walled carbon nanotubes.

Methods for coating particles, such as fracture proppant particles, are known in the art and include spraying, sputtering, vacuum deposition, dip coating, extrusion, calendaring, powder coating, transfer coating, air knife coating, roller coating and brush coating.

In a particular embodiment, the coating material further comprises at least one filler. The coating material may comprises from 5% to 70%, preferably from 10 to 40% filler material by weight of the overall coating material. The relative amounts of filler may be adjusted by one skilled in the art to tailor the final proppant particles to achieve desirable physical properties, including particle density, bulk density, crush strength, etc.

The filler may have various morphologies, for example, isotropic, including spherical shapes, platy or acicular. The fillers may therefore be in the form of fibers, hollow or solid pellets or powders. In a particular embodiment, the filler may be any micro-sized particle that is compatible with the coating material and with the ultimate use of the particles as defined herein. In another embodiment, the filler may be any nano-sized particle that is compatible with the coating material and with the ultimate use of the particles as defined herein. In the context of the present invention "micro-sized particle" refers to particles with a size ranging from $1 \times 10^{-7}$ to $1 \times 10^{-4}$ m, whereas "nano-sized particle" refers to particles with a size ranging from $1 \times 10^{-9}$ to $1 \times 10^{-7}$ m.

In a particular embodiment, the filler comprises at least one of glass microbubbles, glass microspheres, silica, calcium carbonate, ceramic microspheres, aluminum silicate, carbon black, mica, micaceous iron oxide, aluminum oxide, radionuclides or feldspar. In a particular embodiment, the filler comprises zero-valent iron ($Fe^0$). In another particular embodiment, the filler comprises iron oxide.

In another particular embodiment, the particles used in the invention further comprise a penetrating material. By "penetrating material" should be understood a material that penetrates into the porous matrix of the particles impregnating their pores. The porosity and permeability characteristics of the particles used in the invention allows the penetrating material to be drawn at least partially into the porous matrix of the particle by capillary action or by vacuum and/or pressure impregnation. For example, the particles may be immersed in a penetrating material and then exposed to pressure and/or vacuum to at least partially penetrate or impregnate the material.

The penetrating material may be selected so that it helps to structurally support the matrix of the porous particles, i.e., increases the strength of the particles, and increases the ability of particles to withstand the closure stresses of a hydraulic fractured formation or other downhole stresses.

For example, a penetrating material may be selected by balancing the need for low apparent density versus the desire for strength, since a more dense material may provide much greater strength. In this regard, the inherent porosity of the particles used in the invention may be altered so as to help provide the desired balance between apparent density and strength. It should be noted however that the inherent properties of the particles of the invention are such that no density-increasing agents are generally needed.

Non-limiting examples of penetrating materials that may be used with the particles in the present invention include, but are not limited to, resins, plastics, cements, sealants, binders or any other material or combination of any of these materials suitable for at least partially penetrating the porous matrix of the particles used in the invention to provide, for example, improved characteristics of strength/crush resistance. Specific examples of plastic include, but are not limited to, nylon, polystyrene, polyol esters, divinyl benzene polystyrene, etc. and combinations thereof. Suitable resins include phenol formaldehyde resins, melamine formaldehyde resins, urethane resins, epoxy resins, and mixtures thereof.

The extent of penetration of the penetrating material in the particles is from less than about 1% penetration by volume to more than 25% penetration by volume.

In a particular embodiment, the particles used in the present invention comprise at least one coating material and at least one penetrating material, in any combination from the foregoing lists.

In a particular embodiment, the coating material as described above can also be used as penetrating material as it also penetrates within the porous matrix of the particles.

The coating material and/or penetrating material is generally present in the particles in an amount from about 0.5% to about 10% by weight on the basis of the total weight of the particle.

Ultra-high molecular weight polyolefins according to the present invention may be prepared employing different methods known in the art, non-limiting examples of which are mentioned below. Shamiri et al. (Materials, 2014, 7, 5069-5108) review the influence of Ziegler-Natta and metallocene catalysts on polyolefin structure, including their influence on the control of the molecular weight of said polyolefins. EP0626393 describes a process for the preparation of spherical polyolefins, and particularly ultra-high molecular weight polyethylene, under a specific Ziegler-Natta catalyst system. EP0878490 further reports a loop/slurry process for the preparation of ultra-high molecular weight olefin polymers in the absence of hydrogen. EP0683178 describes a process for the preparation of ultra-high molecular weight polyethylene in homopolymeric form or as copolymers with other olefins, and with narrow particle size distributions. JPH07292021 describes a process for the preparation of ultra-high molecular weight polypropylene. Particularly preferred in the context of the present invention is the preparation of ultra-high molecular weight polyolefins according to the well-known Mitsui CX process, a slurry phase polymerization which takes place in a two-reactor system (reviewed in J M Asua, Polymer Reaction Engineering, 2007, 105-106). The teachings of all the above documents are herein incorporated by reference.

Ultra-high molecular weight polyolefins are also commercially available. For example suppliers of ultra-high molecular weight polyethylene include Ticona (e.g. GUR 2122, 4113, 4120, 4130, 4150, 4152, 4170, GUR GHR 8020, 8110), Koninklijke DSM N.V./Royal DSM (e.g. Stamylan UH034, UH210, UH410, UH610), Braskem (e.g. UTEC 3040, 3041, 6540, 6541, IDEALIS 500), Mitsui Chemicals (e.g. HI-ZEX MILLION 030S, 145M, 240S, 240M, 320MU, 340M, 341L, 630M, MIPELON XM220, XM221U, PM200), Reliance Industries Ltd. (e.g. Relene Ultra 2504).

The particles used in the present invention may be used alone or as part of a composition. Therefore, the present invention also refers to a composition comprising the particles as described herein, and a fracturing fluid. Methods for combining proppant particles and fracturing fluids into fracturing compositions are well-known to the person skilled in the art. For example the components of the fracturing composition may be combined in a vessel such as a mixer, blender, and the like such as to achieve mixing, agitation or stirring of the components. In some embodiments, the components of the fracturing composition are injected into the fracture "on the fly", i.e. the components are combined as they are being injected into the fracture.

In the present invention the term "fracturing fluid" or "treatment fluid" has the meaning generally understood by the person skilled in the art, and refers to any fluid capable of carrying the particles described herein into fractures. In an embodiment, the fracturing fluid is selected from water based fluids such as fresh water, sea water, sodium chloride brines, calcium chloride brines, potassium chloride brines, sodium bromide brines, calcium bromide brines, potassium bromide brines, zinc bromide brines, ammonium chloride brines, tetramethyl ammonium chloride brines, sodium formate brines, potassium formate brines, cesium formate brines; water based polymer and polymer containing fluids such as hydroxypropyl guar (HPG), carboxymethylhydroxypropyl guar (CMHPG), carboxymethyl guar (CMG), hydroxyethyl cellulose (HEC), carboxymethylhydroxyethyl cellulose (CMHEC), carboxymethyl cellulose (CMC), starch based polymers, xanthan based polymers, and biopolymers such as gum arabic, carrageenan, and the like; non-aqueous fluids such as methanol, ethanol, isopropanol, and other branched and linear alkyl alcohols, diesel, raw crude oils, condensates of raw crude oils, refined hydrocarbons such as gasoline, naphthalenes, xylenes, toluene and toluene derivatives, hexanes, pentanes, and ligroin, natural gas liquids; gases such as carbon dioxide, nitrogen, propane, methane, butane; or combinations or derivatives of any of the foregoing fluids.

In a particular embodiment, the fracturing fluid is selected from a water based fluid, a linear or branched alcohol or mixtures thereof, and gases, particularly methane, propane, nitrogen or carbon dioxide.

The particles of the invention are hydrophobic in nature, which is particularly advantageous when polar fracturing fluids are employed. Repulsion forces between the particles and the fluid induce the formation of an air film around the particles, thus enhancing their transportability into the subterranean fractures and increasing the hydrostatic forces which cause a tendency for the proppant particles to float in the treatment fluid due to their low density.

Therefore, in a particular embodiment, the fracturing fluid is a polar fracturing fluid. In a particular embodiment, the polar fracturing fluid is selected from water based fluids, even more preferably the fracturing fluid is fresh or brackish water, optionally comprising a minimal concentration of other chemicals dissolved or mixed into the water.

The good inherent properties of the particles disclosed herein allow successfully employing the particles as defined in any of the different embodiments described above in a composition without the need to include additives to improve the density or viscosity of the fracturing composition of the invention. Therefore, in a particular embodiment of the invention, the composition of the invention does not include any viscosity-modifying agent, preferably it does not include any viscosity-increasing agent. Non-limiting examples of viscosity-modifying agents are guar gum, hydroxyproplyguar, hydroxyelthylcellulose, xanthan, carboxymethylhydroxypropylguar, diutan, chitosan, or cationic, anionic, nonionic, mixed, zwitterionic or amphoteric surfactants. In another particular embodiment, the composition of the invention does not include any density-modifying agent, preferably it does not include any density-increasing agent. Non-limiting examples of density-modifying agents are silicates, phosphates, borates, fly ash, glass, glass microspheres, ceramic microspheres, aluminosilicates, silica (quartz sand), alumina, mica, kaolin, hematite, calcium carbonate, calcium chloride, calcium bromide, barium sulfate, an alkali metal salt, talc, zirconia and trimanganese tetraoxide. In a particular embodiment, it neither comprises any viscosity-modifying agent nor any density-modifying agent. In a more particular embodiment, the composition of the invention consists of the particles as defined in any of the above mentioned embodiments, and a fracturing fluid. Under these embodiment, less chemical substances are employed as compared with other proppant laden fluids, thus reducing any potential for waste contamination as well as material costs.

However, it should be noted that the present invention also refers to compositions comprising the particles as defined in any of the different embodiments described above and a fracturing fluid, the composition further comprising one or more proppants and/or additives.

Therefore, in a different embodiment, the composition of the invention comprises one or more additional proppant particles, not limited to those described in the present invention. The term proppant particles as employed herein is that generally understood by the person skilled in the art.

The additional proppant particles referred to above may include in specific embodiments one or more of the following materials; sand, sand, glass, ceramic, metallic or polymer-based materials, graded nut shells, resin-coated nut shells, sintered bauxite, particulate ceramic materials, glass beads, and particulate thermoplastic or thermoset polymers.

Mixing other proppants and the proppant particles described herein may be useful, for example, for reducing the cost of proppants while maintaining at least some of the beneficial properties of the particles described herein.

In a different embodiment, the composition of the invention comprises one or more additives which serve the purpose of adapting the properties of the composition to particular kinds of subterranean formations. In a particular embodiment, the additive or additives are selected from the group consisting of a fluid loss control additive, a lost circulation material, a surfactant, a salt, a formation conditioning agent, a foaming agent, an acid, non-emulsifier, solvents, breakers, a biocide, an algicide, crosslinking agent, gelling agent, pH buffer, viscoelastic surfactant, friction reducer, a flow enhancing additive, and combinations thereof.

As mentioned previously, the present invention is also directed to a method for treating a subterranean geological formation penetrated by a wellbore, the method comprising pumping or injecting into the wellbore a plurality of particles as defined herein or a composition according to any of the above embodiments.

In a particular embodiment, the method for treating a subterranean geological formation is a method of fracturing a subterranean geological formation.

The plurality of particles or the composition is injected at a pressure sufficient to create a new fracture or to open an existing fracture in the formation. At least a portion of the particles is placed in the fracture, maintaining the integrity thereof. As described above, the properties of the particles used in the invention are such that relatively low pumping or injecting rates may be used in the method of the invention.

In a particular embodiment, the method for treating a subterranean geological formation penetrated by a wellbore comprises pumping or injecting into the wellbore a composition according to any of the above embodiments.

Thus, in one embodiment the invention provides a method of treating a subterranean geological formation comprising the steps of providing a composition comprising the particles as defined herein and a fracturing fluid, placing the composition into the subterranean formation at a pressure sufficient to create or enhance at least one fracture therein.

Still another embodiment provides a method of hydraulic fracturing a subterranean geological formation comprising the steps of providing a composition comprising the particles as defined herein and a fracturing fluid, placing the composition into the subterranean formation at a pressure sufficient to create or enhance at least one fracture therein.

EXAMPLES

The invention is illustrated by way of the following examples which are not intended to restrict its scope.

The following examples illustrate the behaviour of organic proppant particles comprising at least one ultra-high molecular weight polyolefin with controlled properties depending on the selected polymer composition.

Particle Characterization

The following properties and corresponding standards were employed in the characterization of the particles according to the present invention. Particularly, apparent density was measured according to ISO 60:1977; the melting temperature and crystallinity by Differential Scanning calorimetry (DSC) according to UNE-EN ISO 11357-1: 2010 and ISO 11357-3:11; absolute density according to ISO 1183-1:2012; Intrinsic Viscosity, standardized by ASTM D4020-11 and molecular weight according to Margolies' equation; sphericity, roundness and crush resistance according to ISO 13503-2:2006/API RP19C:2008; long-term conductivity and permeability according to ISO 13503-5:2006/API RP 19D.

Other parameters were determined according to internal methods or using conventional techniques. Particularly, average particle size and particle size distribution were determined by using a particle size analyzer (Mastersizer) available from Malvern Instrument Ltd a Spectris Company.

Thus, the particle size analyses were recorded on a Mastersizer analyzer that use laser diffraction technique. The samples were dispersed in air (dry form) and the intensity of the light scattered at different angles were collected when a laser beam passes through.

Thus, three kinds of data were determined: the particle size, the particle size distribution and the uniformity, which were assigned according to ISO-13320, ASTM-D-1921 or ASTM-D-4464. In particular, D(0.9), D(0.1), D(0.5) and D(4.3) were calculated, where D(0.9), D(0.1), D(0.5) are as described above and D(4.3) is the volume or mass moment mean or the De Broucker mean, in particular the volume mean. The D(4.3) value is the arithmetic average of the particle population.

Commercial Ultra High Molecular Weight Polyolefins

Examples C1-C5: Commercial Ultra High Molecular Weight Polyolefins According to the Invention Examples consisted of the following ultra-high molecular weight polyolefins: UTEC 3040 (supplied commercially by Braskem as a powder), GUR 2122, GUR 4113, GUR 4170 and GUR 4120 (supplied commercially by Ticona (now Celanese)). The physical properties of these polyolefins are summarized in Table 1. In particular, differential Scanning calorimetry (DSC) shows a low crystallinity as expected for ultra-high molecular weight polymers.

Example CE1: Commercial High Molecular Weight Polyolefin (Comparative Example)

Comparative example consisted of GHR 8110 supplied commercially by Ticona as a High Molecular Weight PE grade. The physical properties of the commercial High Molecular Weight PE are summarized in Table 1. In particular, Differential Scanning calorimetry (DSC) shows a medium crystallinity as expected for high molecular weight polymers.

TABLE 1

Properties of Commercial Ultra High Molecular Weight Polymers and Comparative Example of Commercial High Molecular Weight Polymer

| Name | Example | Tm, °C. | Cristallinity % | Apparent Density (g/ml) | Mw ($10^6$ g/mol) | D(0.1) | D(0.5) | D(0.9) | D(4.3) | Span |
|---|---|---|---|---|---|---|---|---|---|---|
| UTEC 3040 | C1 | 133 | 50.5 | 0.52 | 2.58 | 104.93 | 175.68 | 277.83 | 184.43 | 0.98 |
| GUR2122 | C2 | 133 | 50.8 | 0.30 | 2.18 | 53.64 | 146.49 | 321.87 | 170.78 | 1.80 |
| GUR4113 | C3 | 133 | 54.0 | 0.51 | 2.74 | 77.50 | 128.25 | 202.85 | 134.94 | 0.97 |
| GUR4170 | C4 | 133 | 48.3 | 0.54 | 6.70 | 76.54 | 131.02 | 208.52 | 137.15 | 1.00 |
| GUR4120 | C5 | 132 | 51.2 | 0.53 | 2.09 | 75.90 | 119.08 | 177.85 | 123.39 | 0.85 |
| GHR8110 | CE1 | 132 | 62.3 | 0.52 | 0.64 | 68.21 | 113.92 | 178.94 | 119.14 | 0.97 |

Compared to the high molecular weight polyolefin, ultra-high molecular weight polyolefin particles according to the present invention provide higher conductivity and crush resistance, ultimately allowing improved gas or liquid propagation. In addition, these polyolefin particles have excellent apparent and absolute density. Therefore, a good balanced permeability and sustainability was obtained in the ultra-high molecular weight polyolefin particles of this invention.

In particular, the polyolefin particles of Examples C1-C4 and CE1 were used for single-point Long-term Conductivity test comparisons (Table 2). Thus, resins according to this invention have good crush resistance and conductivity measured according to ISO 13503-2:2006/API RP19C:2008 and ISO 13503-5:2006/API RP 19D. Therefore, these Ultra High Molecular Weight polyolefin particles are in agreement with proppant requirements and are suited for hydraulic fracturing, in particular conventional or non-conventional fracturing techniques.

TABLE 2

Long-Term Conductivity, permeability and width at 13789514.56 Pa (2000 psi) and 65.55° C. (150° F.) for examples according to the invention C1-C4 and comparative CE1.
API Long-Term Conductivity Test

| Closure Pressure, Pa | UTEC 3040 C1 | GUR4113 C3 | GUR4170 C4 | GUR2122 C2 | GHR8110 CE1 |
|---|---|---|---|---|---|
| Permeability at 65.55° C. (150° F.), $m^2$ | | | | | |
| 13789514.56 (2000 psi) | $1.77646194 \times 10^{-14}$ (0.0180 Darcy) | $1.08561563 \times 10^{-14}$ (0.0110 Darcy) | $7.20454009 \times 10^{-15}$ (0.0073 Darcy) | $4.44115485 \times 10^{-15}$ (0.0045 Darcy) | $2.9607699 \times 10^{-15}$ (0.0030 Darcy) |
| Pack Width at 65.55° C. (150° F.), mm | | | | | |
| 13789514.56 (2000 psi) | 6.19 | 6.03 | 6.30 | 6.11 | 5.89 |
| Conductivity at 65.55° C. (150° F.), $mm^2 * m$ | | | | | |
| 13789514.56 (2000 psi) | $1.082931199 \times 10^{-13}$ (0.360 mD * ft) | $6.61791288 \times 10^{-14}$ (0.220 mD * ft) | $4.512213328 \times 10^{-14}$ (0.150 mD * ft) | $2.737409419 \times 10^{-14}$ (0.091 mD * ft) | $1.744722487 \times 10^{-14}$ (0.058 mD * ft) |

The invention claimed is:

1. A method for treating a geological subterranean formation penetrated by a wellbore, the method comprising pumping or injecting into the wellbore a plurality of proppant particles, said particles comprising an ultra-high-molecular-weight polyolefin as proppant, wherein the ultra-high-molecular-weight polyolefin has a viscosity average molecular weight in a range from $0.8 \times 10^6$ to $12 \times 10^6$ g/mol, an apparent density in a range from 0.2 to 0.7 g/mL and a sphericity of 0.5 or higher, and wherein said proppant particles provide a proppant pack conductivity greater than $1.744722487 \times 10^{-14}$ $m^2 \cdot m$ (0.058 mD·ft) at 65.5° C. and 13789514.56 Pa (2000 psi).

2. The method according to claim 1, wherein the ultra-high molecular weight polyolefin is ultra-high molecular weight polyethylene or ultra-high molecular weight polypropylene.

3. The method according to claim 1, wherein the viscosity average molecular weight of the ultra-high-molecular-weight polyolefin ranges from $2 \times 10^6$ to $10 \times 10^6$ g/mol.

4. The method according to claim 1, wherein the ultra-high-molecular-weight polyolefin has an apparent density lying in the range from 0.3 to 0.5 g/mL.

5. The method according to claim 1, wherein the particles have a sphericity of at least 0.7.

6. The method according to claim 1, wherein the particles have a porosity between 2 and 50% by volume.

7. The method according to claim 1, wherein the particles further comprise a coating material.

8. The method according to claim 7, wherein the coating material comprises an electrically conductive material.

9. The method according to claim 8, wherein the electrically conductive material is a metal.

10. The method according to claim 1, wherein the particles further comprise a penetrating material.

11. The method according to claim 7, wherein the coating material comprises a plastic and/or a polymeric resin, and wherein the plastic is selected from nylon, polystyrene, polyol esters, divinyl benzene polystyrene and combinations thereof, and wherein the polymeric resin is selected from phenol formaldehyde resins, melamine formaldehyde resins, urethane resins, epoxy resins, and mixtures thereof.

12. The method according to claim 10, wherein the penetrating material comprises a plastic and/or a polymeric resin, and wherein the plastic is selected from nylon, polystyrene, polyol esters, divinyl benzene polystyrene and combinations thereof, and wherein the polymeric resin is selected from phenol formaldehyde resins, melamine formaldehyde resins, urethane resins, epoxy resins, and mixtures thereof.

13. A composition comprising:
(i) proppant particles, said particles comprising an ultra-high-molecular-weight polyolefin as proppant, wherein the ultra-high-molecular-weight polyolefin has a viscosity average molecular weight in a range from $0.8 \times 10^6$ to $12 \times 10^6$ g/mol, an apparent density in a range from 0.2 to 0.7 g/mL and a sphericity of 0.5 or higher, and wherein said proppant particles provide a proppant pack conductivity greater than $1.744722487 \times 10^{14}$ m²·m (0.058 mD·ft) at 65.5° C. and 13789514.56 Pa (2000 psi); and
(ii) a fracturing fluid suitable for carrying the particles; wherein the proppant particles float in the fracturing fluid.

14. The composition according to claim 13, wherein the fracturing fluid is water, a linear or branched alcohol or mixtures thereof, or a gas selected from a hydrocarbon based-gas, carbon dioxide and nitrogen.

15. The composition according to claim 13, further comprising one or more additional proppant particles.

16. A method for treating a subterranean geological formation penetrated by a wellbore, the method comprising pumping or injecting into the wellbore a composition as defined in claim 13.

17. The method according to claim 1, wherein the proppant particles provide a proppant pack permeability of higher than $2.9607699 \times 10^{-15}$ m² (0.003 Darcys) at a closure pressure of 13789514.56 Pa (2000 psi).

18. The method according to claim 13, wherein the proppant particles provide a proppant pack permeability of higher than $2.9607699 \times 10^{-15}$ m² (0.003 Darcys) at a closure pressure of 13789514.56 Pa (2000 psi).

19. The composition according to claim 13, wherein the fracturing fluid is water or a water-based fluid.

20. The composition according to claim 19, wherein the water-based fluid is selected from the group consisting of fresh water, sea water, sodium chloride brines, calcium chloride brines, potassium chloride brines, sodium bromide brines, calcium bromide brines, potassium bromide brines, zinc bromide brines, ammonium chloride brines, tetramethyl ammonium chloride brines, sodium formate brines, potassium formate brines, and cesium formate brines.

* * * * *

UNITED STATES PATENT AND TRADEMARK OFFICE
CERTIFICATE OF CORRECTION

PATENT NO.           : 10,870,792 B2
APPLICATION NO.      : 15/552668
DATED                : December 22, 2020
INVENTOR(S)          : López Reyes et al.

It is certified that error appears in the above-identified patent and that said Letters Patent is hereby corrected as shown below:

In the Claims

Column 14, Line 66:
polyol esters, divinyl benzene polystyrene and combinations
Should read:
polyol esters, divinyl benzene polystyrene or combinations Column 15, Line 6:
styrene, polyol esters, divinyl benzene polystyrene and
Should read:
styrene, polyol esters, divinyl benzene polystyrene or Column 15, Line 9:
aldehyde resins, urethane resins, epoxy resins, and mixtures
Should read:
aldehyde resins, urethane resins, epoxy resins, or mixtures Column 15, Line 26:
based-gas, carbon dioxide and nitrogen.
Should read:
based-gas, carbon dioxide or nitrogen.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*